April 25, 1961 A. FRÖHLICH ET AL 2,981,310
TURNOVER RING FOR PNEUMATIC TIRE BUILDING MACHINE
Filed April 19, 1956 4 Sheets-Sheet 1

INVENTORS
ADOLF FRÖHLICH &
EDWARD J. HARRIS
BY J. William Freeman
ATTORNEY

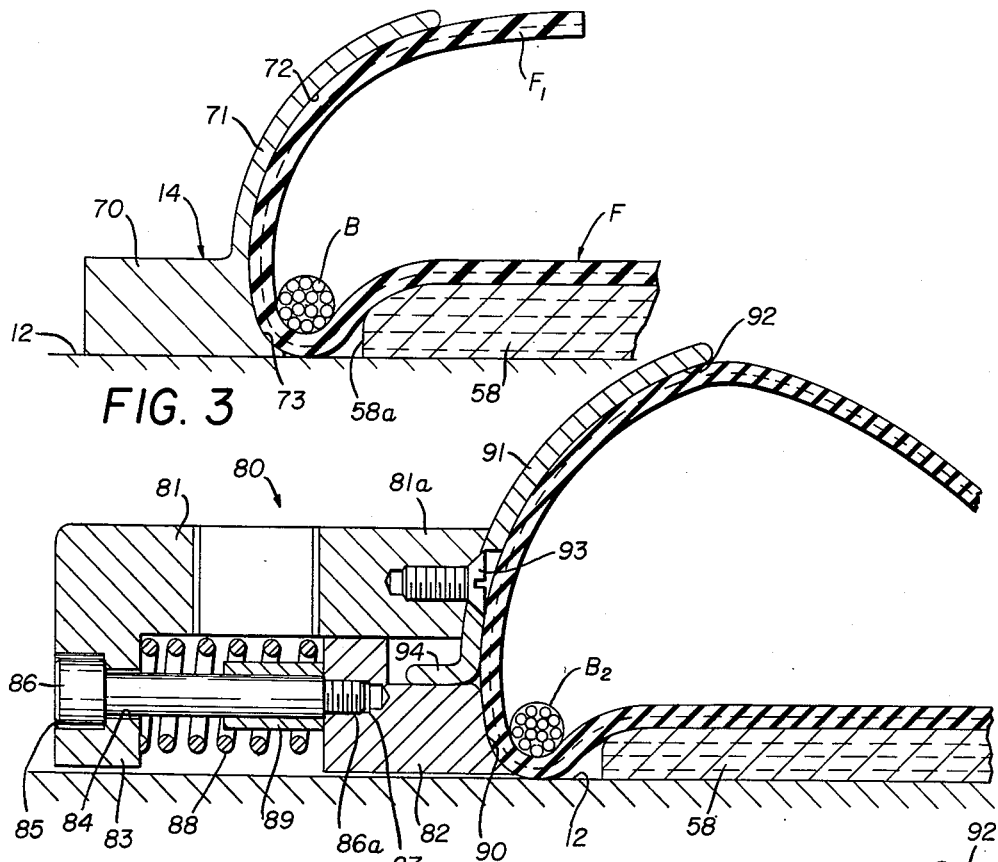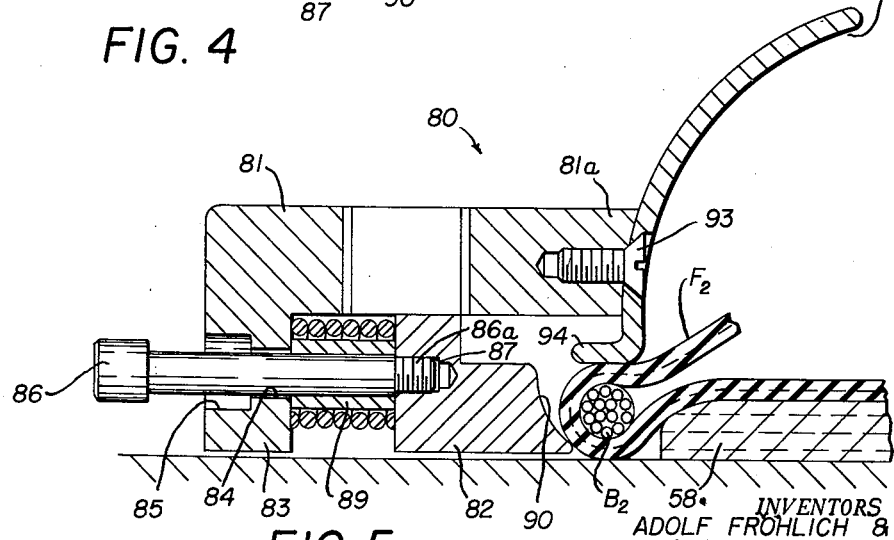

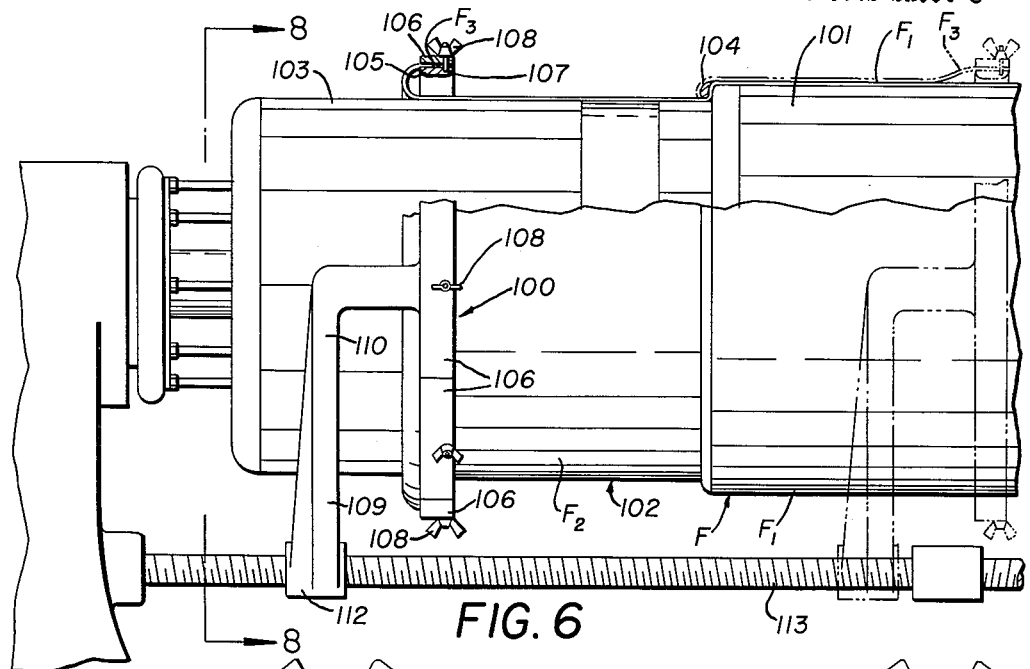
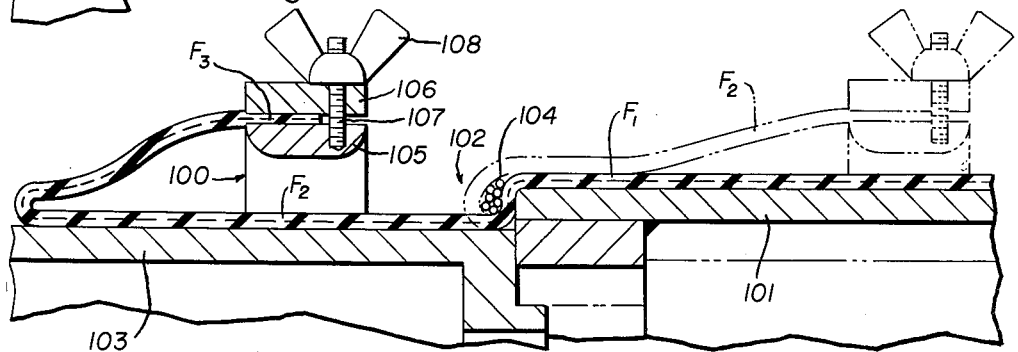
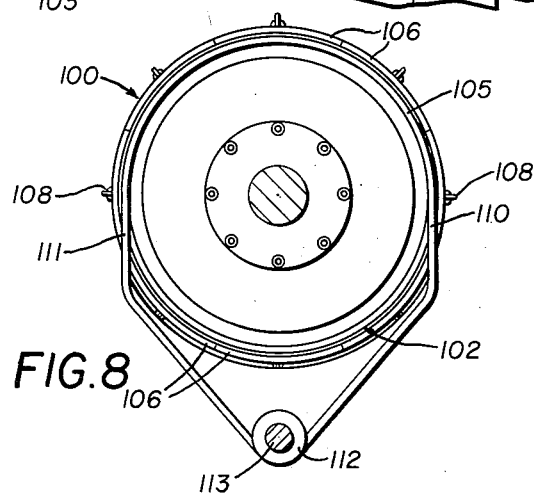

April 25, 1961   A. FRÖHLICH ET AL   2,981,310
TURNOVER RING FOR PNEUMATIC TIRE BUILDING MACHINE
Filed April 19, 1956   4 Sheets-Sheet 4

INVENTORS
ADOLF FRÖHLICH &
EDWARD J. HARRIS
BY
J. William Freeman
ATTORNEY

United States Patent Office 2,981,310
Patented Apr. 25, 1961

2,981,310

TURNOVER RING FOR PNEUMATIC TIRE BUILDING MACHINE

Adolf Fröhlich and Edward J. Harris, Akron, Ohio, assignors to The Cleveland Trust Company, Cleveland, Ohio Filed Apr. 19, 1956, Ser. No. 579,404

8 Claims. (Cl. 154—10)

This invention relates to the art of pneumatic tire manufacture, and in particular has reference to new and improved types of building forms and methods of forming pneumatic tires in the "green" or uncured state.

In the art of pneumatic tire manufacture a plurality of fabric plies are successively applied over a cylindrical building drum until a composite cylinder of fabric plies is formed thereabout. Bead rings are then positioned in an encircling relationship inwardly of the built up fabric, and the projecting free edges of the fabric are turned over to effectuate "setting" of the bead rings. At this point breaker and chafer strips, as well as tread stock are successively applied over the built up fabric ply, and the result is the formation of a tire body that has a generally cylindrical or "flat-built" form. Such uncured tire bodies as above described, are subsequently shaped and cured by the use of various types of vulcanizing apparatus in order to produce a finished pneumatic tire.

While the above process of manufacture has been used in the manufacture of pneumatic tires having fabric cords therein particular difficulty has been encountered with the advent of certain high strength cord materials such as wire, nylon, etc. The inherent stiffness and strength of these cords makes the aforementioned turnover operation difficult, and in the case where a large number of plies are employed, it is highly unsatisfactory for this operation to be manually effectuated.

Because of the relatively recent introduction of such wire fabric plies, few attempts have been made in the past to overcome this difficulty of turning over the fabric ply.

In U.S. Patent 2,440,662, issued on April 27, 1948, to L. C. Frazier, there was disclosed an apparatus for building pneumatic tires that employed an inflatable annular band as the transferring agent to effectuate the turnover operation. The operation of this device was predicated upon the use of telescoping members which received therebetween the aforementioned inflatable band, and the axial telescoping of the respective members operated to roll the band so that fabric ply received thereon was transferred to a buidling drum. U.S. Patents 2,565,071 and 2,653,645, issued respectively on August 21, 1951 and September 29, 1953 to L. C. Frazier, added refinements to the earlier Frazier patent above discussed, and in the main these improvements consisted of the use of an additional inflatable band interiorly of the drum, with the inflation of the band being operable to expand the peripheral surface of the building drum.

It will be noted that in all of the Frazier patents above referred to that the turning over of the fabric ply was effectuated by the use of an inflatable band that rolled between telescoping outer and inner surfaces to effectuate the transfer. Such a device is, by virtue of the large number of component parts employed therein, expensive to build, and would additionally be costly to maintain, in view of the relatively short life of the inflatable band members that are employed therein. Additionally, because of the use of an inflatable member between telescoping members, it is entirely possible that either the band or the fabric supported thereon will jam between the telescoping members instead of turning over as theoretically indicated in the patent drawings.

It has been found that if a rigid ring member is moved axially of the building drum under controlled conditions that the turnover operation may be simply and easily effectuated, without modifying present apparatus now employed for manufacturing pneumatic tires.

It accordingly becomes a principal object of this invention to provide a turnover ring for folding fabric ply over a positioned bead ring.

It is a further object of this invention to provide a simplified turnover ring for use with existing tire building machinery that will quickly and efficiently turn over fabric plies and position the same about a bead ring without manual assistance.

These and other objects of the invention will become more apparent upon a reading of the following brief specification, considered and interpreted in the light of the accompanying drawings.

Of the drawings:

Figure 3 is an enlarged vertical sectional view of the improved turnover ring of the tire machine.

Figures 4 and 5 are similar sectional views of a modified turnover ring.

Figure 6 is a schematic elevation of a slightly modified form of the invention.

Figure 7 is an enlarged vertical section of the turnover ring shown in Figure 6.

Figure 8 is a view taken on the lines 8—8 of Figure 6.

Figure 1:
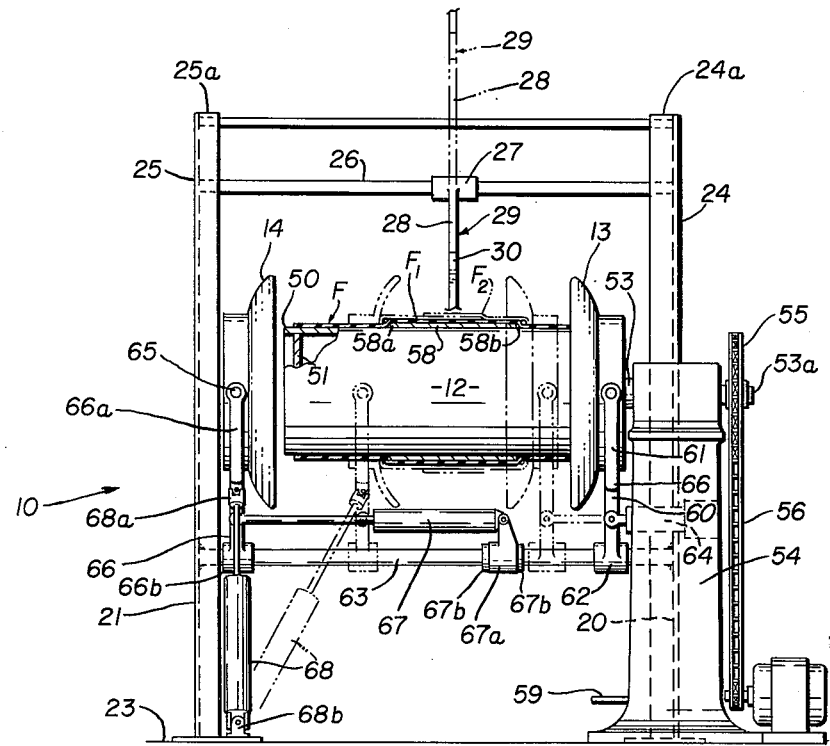
Figure 1 is a frontal schematic elevation of a tire building machine embodying the teachings of this invention.
Figure 2:
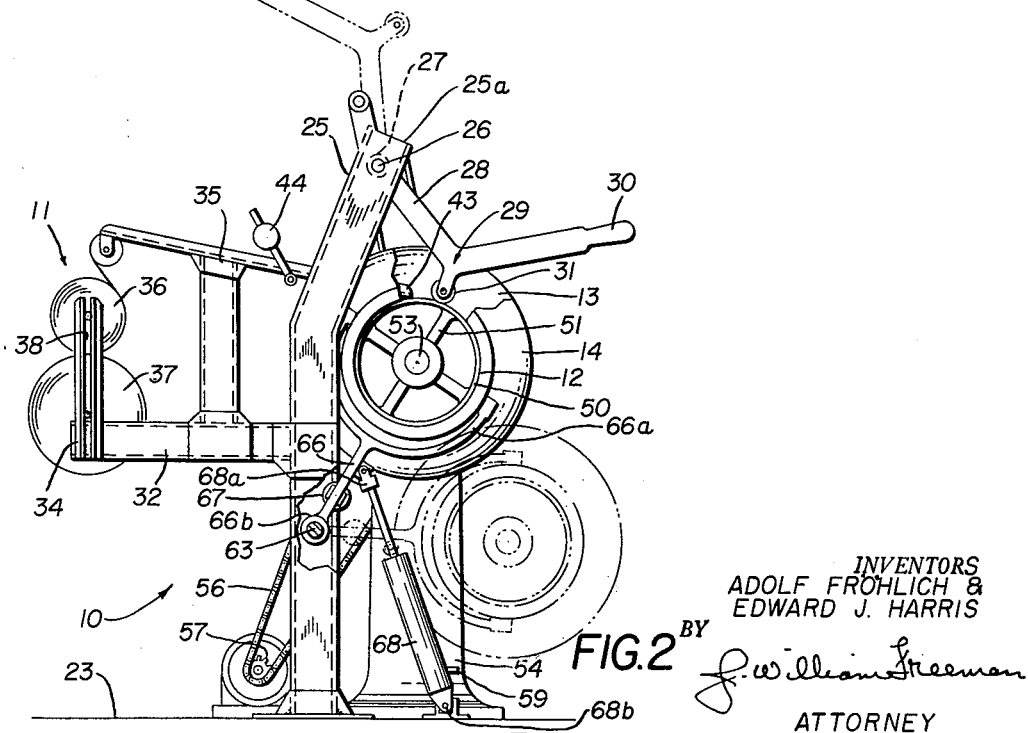
Figure 2 is a side view of the above machine.

Referring now to the drawings, and in particular to Figures 1, 2 and 3 thereof, the improved tire building machine, generally designated by the numeral 10, is semi-schematically shown in the drawings as including a servicer 11 that delivers fabric ply F to a rotatable building drum 12 so that the same may be built to a flat-built, uncured tire body configuration upon alternate operation of turnover rings 13 and 14 that are respectively operable adjacent the opposed axial ends of drum 12, as will be presently described.

In order that the component parts might be more fully understood, the same will be individually described.

*Servicing means*

The servicing means that have been generally designated by the numeral 11 are further shown in Figures 1 and 2 of the drawings as including a pair of upright standards 20 and 21 that are secured to floor 23 in known manner, so that the upper ends 24 and 25 thereof respectively project at an acute angle to the vertical, with the extreme projecting ends 24a, 25a thereof substantially overlying the drum 12 adjacent its axial ends.

For purposes to be described, these extreme projecting ends 24a, 25a support the axial ends of a shaft 26 that receives thereabout, as best shown in Figure 1, a bushing 27; this arrangement being such that the bushing 27 is secured to one leg 28 of a V-shaped stitcher arm 29 having a handle 30 and a stitching wheel 31 that is capable of contact with fabric F that is applied about drum 12. While this arm 29 is moved between the full and chain-dotted line positions of Figure 2, it is also to be understood that the mounting of bushing 27 on shaft 26 is such that the bushing 27, together with the arm 29 and stitcher wheel 31 can be moved axially of shaft 26, with the requisite degree of pressure being applied to the stitcher wheel 31 by exerting a force on handle 30.

To the end of supporting additional component parts, the standards 20 and 21 are further shown as including horizontal frame members 32 and 33 that project rearwardly of the machine 10 in a horizontal plane so as to support a vertical fabric rack 34 and a ply pan 35. In this manner, a roll of cord and liner material 36, together with a windup roll 37 can be received in the vertical guideway 38 of the member 34 so that fabric ply F can be dispensed as shown in Figure 2, to the ply pan 35. Fabric received at the left end (Figure 2) of the ply pan 35 is moved thereacross by the usual rolls that are provided for this purpose, with only one such roll being shown in the schematic illustration of the invention.

Material so moved across the ply pan 35 is dispensed at open end 43 over the tire building drum 12, as best shown in Figure 2 of the drawings with counterweight 44 serving to permit withdrawal of pan 35 in known manner.

*The building drum and operating mechanism therefor*

Considering next the detailed structure of the building drum 12, it will be seen from Figures 1 and 2 of the drawings that the same includes a hollow cylindrical form 50 that is mounted through spiders 51, 51 upon a concentric shaft 53; the arrangement being such that this shaft 53 is journaled within a pedestal 54 so as to have the end 53a thereof provided with a sprocket 55 that can be driven as a result of chain 56 being applied over the drive sprocket of motor 57. As best shown in Figure 1 of the drawings, the overall drum mechanism 12 includes a flexible liner 58 that is made of considerable thickness, whereby the axially spaced radially extending end walls 58a and 58b thereof can be used as bead seats for fabric ply received thereon, as shown in Figure 2. A foot jogger switch 59 of known construction operates to intermittently rotate the drum 12 when required.

*The turnover rings 13 and 14*

Considering now the turnover rings 13 and 14, it will best be seen from Figure 2 of the drawings that these turnover rings are located adjacent axial ends of the drum 12; the arrangement being such that the turnover ring 13 which is disposed adjacent the "closed" end of the machine, is axially reciprocated by the use of a yoke 60 that has the free ends of arm members 61, 61 thereof pinned to the ring 13, while the opposed end 62 thereof is mounted upon a shaft 63 that is secured between standards 20 and 21 as shown in Figure 2 of the drawings. In this manner, use of an expandable piston 64 interconnecting the yoke 60 with the pedestal 54 will operate to axially shift the yoke 60, together with ring 13, axially of the closed end of drum 12.

The remaining ring 14, while sliding axially of drum 12, is required to be removed from a position of encirclement about drum 12 to permit removal of the finished tire from the drum. Accordingly, this ring 14 must be moved completely off the drum 12 as shown in Figure 1 in full lines and must then be pivoted about shaft 63 to assume the chain-dotted position of Figure 2.

To this end the ring 14 is shown pinned as at 65, to the arms 66a, 66a of a yoke 66, the central or opposite end of which is defined by a bushing 66b that is received on shaft 63 as shown in the drawings, with piston 67 serving to axially move the ring 14 between the full and chain-dotted positions of Figure 1 as a result of adapter sleeve 67a being secured to shaft 63 by set rings 67b, 67b.

For the purpose of pivoting the ring 14 between the full and chain-dotted line positions of Figure 2, the yoke 66 is further acted upon by a cylinder 68 that has a universal adapter 68a secured to yoke 66, while a similar universal adapter 68b secures the piston 68 with respect to floor 23.

As is best shown in Figure 3 of the drawings, each ring member 13 and 14 is defined by an annular ring 70 that has a radially projecting flange 71 provided with a concave surface 72 on the inboard side thereof, with such concave surface 72 terminating at the radially inward edge thereof in a relatively sharp concavity indicated by the numeral 73. In this manner, a deflector or cam surface defined by the concave surfaces 72 and 73 is provided; the arrangement being such that as each ring is moved towards the medial portion of the drum 14 the extreme edge of fabric F will first strike the sharp concave surface 73 and will be raised upwardly out of contact with the external surface of the drum. As further inward movement of these ring members continues, the edge portion of the fabric ply will be diverted towards the position of Figure 3, at which time the same will have been folded over bead B as shown in Figure 3 of the drawings.

*Operation of the improved turnover ring*

In use or operation of the improved pneumatic tire machine, it will first be assumed that the component parts have been positioned as indicated, and further, that the liner 58 has been positioned medially of drum 12, with fabric ply F being received thereabout as shown in Figure 1 of the drawings. Prior to this a bead may have been inserted over the closed ends prior to the installation of the fabric ply, and at such time as the fabric ply is positioned both beads B, B may be set as shown in Figure 1; it having been assumed that fabric ply F has been dispensed from the servicer 11 in known manner so that the fabric is on the drum, as shown in Figure 1. At this time the yoke 60 may be operated by energizing piston 64, and as ring 13 moves to the left of Figure 1 it is apparent that each portion $F_1$ of the fabric ply F will be turned upwardly and over the bead $B_1$ until this edge portion $F_1$ overlies the edge of the liner 58. Actuation of piston 67 after pivoting of yoke 66 will result in a similar turnover of each portion 52, which turnover operation is shown in progress to the left of Figure 1 of the drawings. When this turnover of the portion 52 is complete both rings 13 and 14 may be moved to their extreme outboard position, and the arm 29 moved about its pivot point as defined by shaft 26, so that stitcher wheel 31 may be axially shifted to stitch the turned over edge portions $F_1$ and F to the medial portion of the tire.

Upon repetition of the above operation the ring 14 may be shifted to its axial extremity and out of contact with drum 12, at which time pivoting of the same with respect to the floor will permit removal of the tire body T due to the liner 58 being capable of easily sliding off drum 12.

At this time the above sequence of events may be repeated for the building of another pneumatic tire body.

*Modification of Figures 4 and 5*

The modified form of the invention illustrated in Figures 4 and 5 of the drawings is substantially similar to that described above in connection with Figures 1, 2 and 3, with the exception that a modified type of turnover ring mechanism is employed. Accordingly, it is to be understood that the mounting and operation of the pair of ring members employed is similar to that described above. These ring members 80, 80 are identical with the exception that the same are made opposite hand to each other, and accordingly in Figures 4 and 5 a typical ring member 80 is illustrated; it being understood that a similar ring member 80 of opposite hand configuration is employed at the opposite axial end of drum 12. Thus, where indicated, like numerals designate like parts.

Each turnover ring 80 includes an outer annular ring 81 and an inner annular ring 82 that is shiftable axially of the ring 81 as will presently be described. As is best shown in the drawings, the outer ring 81 includes a radial end flange 83 that is apertured and counter-bored as at 84 and 85, respectively to receive a bolt 86, the threaded end 86a of which is received in appropriate tapped aperture 87 as provided on the ring 82.

For the purpose of maintaining the rings 81 and 82 in the axially spaced condition of Figure 4, there is provided a spring 88 that seats at its opposed ends against the member 82 and the radial flange 83, with spacer ring 89 limiting the extent of axial movement between the members 81 and 82, as best shown in Figure 5 of the drawings. To the end of providing the members 81 and 82 with turnover surfaces that will operate to turn the ends of the fabric ply over upon axial movement of overall ring 80, the inboard end of the ring 82 is shown contoured to define a concave surface 90, similar in configuration to the surface 73 described in Figure 3 of the drawings. By like token, the inboard end 81a of ring 81 receives a circular shield 91 having a concave inner surface 92, against which the fabric ply may be formed, as shown in Figure 4; with such shield held in position by one or more bolts 93, 93 securing the shield 91 with respect to the ring 81.

The turnover ring 80 of the modified form of the invention has for a prime purpose the "crimping" of the fabric ply about the bead $B_2$ for example; the shield 91 being shown as having the radially innermost edge portion thereof defined by horizontal flange 94 that moves axially of the drum 12 so as to position the fabric $F_2$ in the position shown in Figure 5 upon axial movement of the ring 81.

The operation of the above described modified form of the invention is substantially similar in every respect to that previously described in connection with Figures 1, 2 and 3 of the drawings, with the single exception that the turnover rings 80, 80 function differently during the actual bead setting operation. In this regard, as has been indicated above, the ends of the fabric ply F are turned over as shown in Figure 4 and when the surface 90 becomes positioned adjacent the bead $B_2$ as shown in Figure 4 continued axial movement of the yoke (not shown) will operate to move the ring 81 axially, even though the ring member 82 is retained in the position of Figure 4 against further axial movement. As a result of this continued axial movement of the ring 81, the shield 91, together with the flange 94 will press or crimp fabric ply $F_2$ to the position of Figure 1. At this time backing off of the entire ring assembly 80 will permit usage of the conventional stitcher wheel 31 (see Figures 1 and 2) to stitch the turned over fabric to the medial portion thereof that is received upon the liner 58. On turning over of the axial ends and application of the required number of plies the built up tire may be removed as before indicated.

*The modification of Figures 6, 7 and 8*

The modified form of the invention shown in Figures 6, 7 and 8 of the drawings envisions a still further modified form of the turnover ring that is generally indicated by the numeral 100; and further envisions the use of a different type of building drum that has a plurality of expandable staves 101, 101 arranged in a circular course medially of the building drum so as to be expandable to the position of Figure 7. The detailed structure of such a machine is clearly set forth in applicant's co-pending application Serial No. 559,243, filed January 16, 1956; and accordingly, reference is made to said application for a detailed description of the building drum 102.

Turning at this point to Figures 6, 7 and 8 of the drawings, it will be seen that a fabric ply F has been applied about the building form 102 so that the medial portions $F_1$ thereof are superimposed about the staves 101, 101, while the edge portion $F_2$ thereof overlies the drum 103 as shown in Figures 6 and 7. Bead ring 104, applied against the raised shoulder portion completes the positioning of the fabric ply F. As is best shown in Figure 7, the turnover ring 100 comprises a unitary circular ring 105 that has positioned thereabout in encircling relationship a plurality of arcuate segments 106, 106; the arrangement being such that these segments are maintained in gripping relationship with respect to the inner ring 105 by the bolts 107, 107 and wing nuts 108, 108. A yoke 109, as best shown in Figure 8, has the arm ends 110, 111 thereof secured through the inner ring 105 so that the point of convergence as indicated by bushing 112 can be mounted about a screw shaft 113.

In use or operation of this modified form of the invention a partial hand turnover of the fabric ply is first manually effectuated at the extreme outboard ends of the building drum 102 so that the extreme outboard end $F_3$ of the fabric ply can be positioned between the inner ring 105 and the surrounding arcuate segments 106, 106. Upon tightening of the wing nuts 108, 108 this fabric $F_3$ will be firmly gripped in a circular course about the axis of the building form, and upon rotation of the screw shaft 113 in known manner, the ring 100 will be moved from the full to the chain-dotted line positions of Figure 6. At this time fabric ply will be turned over so as to assume the position shown in chain-dotted lines in Figure 7, wherein the fabric ply has been folded over the bead ring 104. At this time the wing nuts 108, 108 may be loosened and the fabric ply $F_3$ removed from its position between the ring 105 and the segments 106, 106; at which time a stitcher may be applied over the end $F_3$ so that the same is firmly stitched down over the medial portion of the building form. At this time the screw shaft 113 may be turned in the opposite direction to return the ring 100 to the full line position of Figure 6. Upon completion of the remaining turnover the tire body may be removed from the drum by merely collapsing the staves 101, 101 and passing the body axially of the drum 102, with the same passing between the exterior surface of the drum 103 and the external surface of the ring 105.

Figure 9:
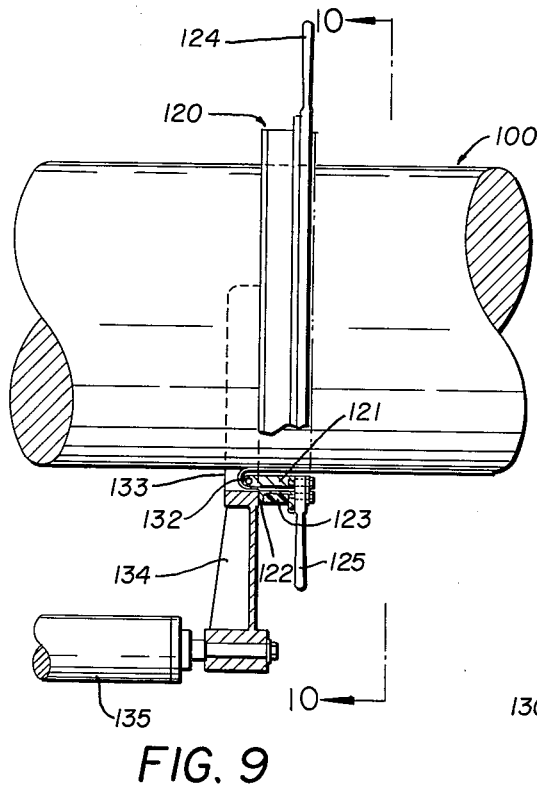
Figure 9 is a schematic elevation of a still further modified form of the invention.
Figure 10:
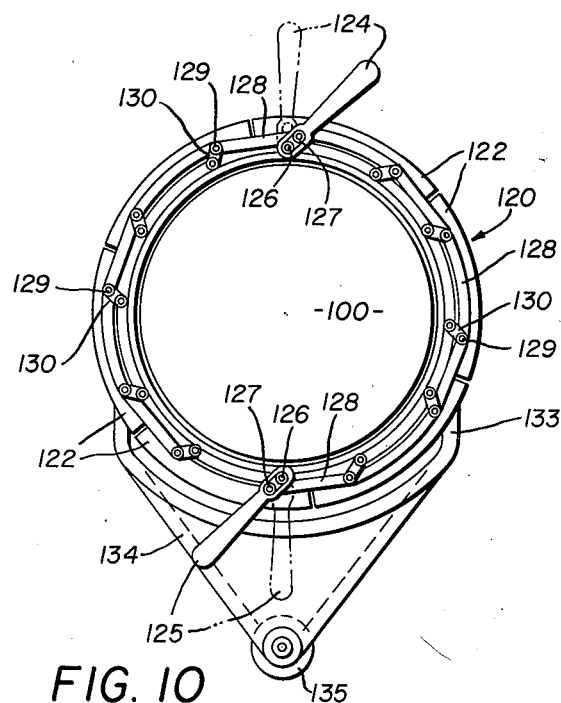
Figure 10 is a view taken on the lines 10—10 of Figure 9.

*Modification of Figures 9 and 10*

The modified form shown in Figures 9 and 10 of the drawings is similar in many respects to the modified just-described form in connection with Figures 6, 7 and 8; in view of the fact that the same envisions a manual turnover followed by a clamping action with axial movement of the turnover ring then being effectuated to complete the turnover operation. Accordingly, where indicated, like numerals indicate like parts.

It will be seen from the drawings that the turnover ring 120 of Figures 9 and 10 utilizes a unitary inner ring 121 that is surrounded by a plurality of arcuate segments 122, 122, each of which is formed in channel-shape, as best shown in Figure 9, so as to receive an endless resilient band 123 that is positioned in encircling relationship to the segments 122, 122.

For the purpose of creating radial spacing between the inner ring 120 and the circular course of outer arcuate segments 122, 122, the inner ring 121 is shown provided with a pair of diametrically opposed lever arms 124 and 125, each of which is pinned as at 126 to the inner ring 121. These lever arms 124, 125 are further provided with pivot points 127, 127 to which may be secured ring members 128, 128, the remaining ends of which pivotally interconnect as at 129, with the segments 122, as well as a link member 130 that is connected at its opposed end as at 131 to the inner ring 121. The above linkage, utilizing link members 128 and 130 is repeated as shown in Figure 10 so that all of the segments 122, 122 will be effectuated by the pair of lever arms 124, 125. As is best shown in Figure 9, the overall ring member 120 has the inner ring 121 thereof connected as at 132 to the divergent arms 133, 133 of a yoke arm 134, with said yoke arm 134 being effectuated axially by piston 135.

In use or operation of the improved turnover ring 120 that is illustrated in Figures 9 and 10 of the drawings, fabric ply is first turned over and positioned about the external surface of the ring 121, with the arcuate segments 122, 122 being radially spaced against the tension of the band 123 as a result of the lever arms 124, 125 being in the chain-dotted line position of Figure 10. When it is desired to grip the fabric between the ring 121 and the arcuate segments 122, 122, it is merely necessary that the lever arms 124 and 125 be moved from the chain-dotted line position to the full line position of Figure 10; at which time the tension of the band 123, acting through the links 128, 128 and 130, 130 will grip the fabric ply between the ring 121 and the arcuate segments 122, 122.

At this time, axial movement of the ring 120 may be effectuated by operating the piston 135 in known manner; with such axial movement effectuating the turning over of the fabric ply about the positioned beads (not shown).

Conclusions

It will be seen from the foregoing that there has been provided a new and novel type of tire building machine that encompasses in its broadest generic principle the use of a turnover ring that is shiftable axially of the building form to effectuate the turnover of fabric ply received on said drum. It has been further shown how the various species of the broad invention operate to provide the user with a choice of turnover rings that can be used with existing or newly developed building forms, dependent upon the type of equipment currently positioned by the user. It has been further shown how in each and every case of the use of turnover rings of the type described, the beads are firmly fixed between the turned over fabric portions, and how the use of these power-actuated turnover rings permits the heretofore unobtainable "long turnover" that is required in the use of wire tire fabric, for example.

In the above specification, a detailed reference has been made to the configuration, construction and composition of certain component parts in accordance with the teachings of the patent statutes. It is to be understood, however, that the invention is not to be so limited, and accordingly, modificaions of the invention may be resorted to without departing from the spirit thereof or the scope of the appended claims.

This application is a continuation in part of co-pending application Serial No. 559,243, filed on January 16, 1956, by Adolf Frohlich and Edward J. Harris.

What is claimed is:

1. A pneumatic tire machine of the character described, comprising; a building drum having a ply receiving surface; an endless turnover ring concentrically aligned with said drum in close adjacency to the exterior surface thereof; means for moving said ring axially of said drum, whereby said ring encircles said drum; and means on said turnover ring progressively removing fabric ply from said ply receiving surface and folding the same on itself; said progressive removal and folding over commencing at one axial edge of a ply received on said ply receiving surface and progressing towards the medial portion thereof.

2. A pneumatic tire machine of the character described, comprising; a building drum having a ply receiving surface; an endless turnover ring concentrically aligned with said drum in close adjacency to the exterior surface thereof; means for moving said ring axially of said drum, whereby said ring encircles said drum; and means on said turnover ring progressively removing fabric ply from said ply receiving surface and folding the same on itself; said progressive removal and folding over commencing at one axial edge of a ply received on said ply receiving surface and progressing towards the medial portion thereof; said first mentioned means for moving said ring including a pivoted yoke member secured at its forked end to said ring and secured at the other end to a reciprocatory device.

3. A pneumatic tire machine of the character described, comprising; a building drum having a ply receiving surface; an endless turnover ring concentrically aligned with said drum in close adjacency to the exterior surface thereof; means for moving said ring axially of said drum, whereby said ring encircles said drum; and means on said turnover ring progressively removing fabric ply from said ply receiving surface and folding the same on itself; said progressive removal and folding over commencing at one axial edge of a ply received on said ply receiving surface and progressing towards the medial portion thereof; said last mentioned means including a segmented clamping ring encircling said turnover ring and being radially movable with respect thereto, whereby the axial edge of said fabric may be clamped between said turnover and said clamping rings.

4. A pneumatic tire machine of the character described, comprising; a building drum having a ply receiving surface; an endless turnover ring concentrically aligned with said drum in close adjacency to the exterior surface thereof; means for moving said ring axially of said drum, whereby said ring encircles said drum; and means on said turnover ring progressively removing fabric ply from said ply receiving surface and folding the same on itself; said progressive removal and folding over commencing at one axial edge of a ply received on said ply receiving surface and progressing towards the medial portion thereof; said last mentioned means including a cam surface provided on said turnover ring and being defined by a thin leading edge that moves between said fabric and said drum during axial movement of said ring, whereby said removed edge of said ply is guided by said cam during axial movement thereof.

5. A pneumatic tire machine of the character described, comprising; a building drum having a ply receiving surface and a medial raised shoulder portion; an endless turnover ring concentrically aligned with said drum in close adjacency to the exterior surface thereof; means for moving said ring axially of said drum, whereby said drum is encircled by said ring; and means on said turnover ring for progressively removing fabric ply from said ply receiving surface and folding the same on itself and over a bead positioned on said ply adjacent one axial edge of said raised shoulder portion; said progressive removal and folding over commencing at one axial edge of the ply received on said ply receiving surface and progressing towards said medial raised shoulder portion.

6. A pneumatic tire machine of the character described, comprising; a building drum having a ply receiving surface; an endless turnover ring concentrically aligned with said drum in close adjacency to the exterior surface thereof; means for moving said ring axially of said drum, whereby said ring encircles said drum; and means on said turnover ring progressively removing fabric ply from said ply receiving surface and folding the same on itself; said progressive removal and folding over commencing at one axial edge of a ply received on said ply receiving surface and progressing towards the medial portion thereof; said last mentioned means including a second turnover ring that is axially shiftable with respect to said first turnover ring; said second turnover ring including a thin leading edge located adjacent the radially innermost surface thereof.

7. The device of claim 6 further characterized by the fact that said second turnover ring and said first turnover ring are urged axially apart under tension.

8. A pneumatic tire machine of the character described, comprising; a building drum having a ply receiving surface; a frame rotatably supporting said building drum at one axial end thereof; a first turnover ring concentrically aligned with said drum at one axial end thereof in close adjacency therewith, and being shiftable axially of said drum in encircling relationship therewith between said supported end thereof and a medial portion of said drum; means on said ring for progressively removing fabric ply from said ply receiving surface and folding the same on itself; a second endless turnover ring concentrically aligned with said drum adjacent its opened end in close adjacency to the exterior surface thereof and being axially shiftable in encircling relationship therewith between the medial portion of said drum and an axial position beyond the end of said drum; and means for pivoting said second ring about its axis of axial movement, whereby fabric received on said drum may be axially withdrawn over the unsupported end thereof; said progressive removal and folding over by said turnover rings commencing at the axial edges of said ply in each instance and progressing towards the medial portions thereof.

References Cited in the file of this patent

UNITED STATES PATENTS

| | | |
|---|---|---|
| 1,524,467 | Abbott, Jr. | Jan. 29, 1925 |
| 2,488,863 | Haase | Nov. 22, 1949 |
| 2,565,071 | Frazier | Aug. 21, 1951 |
| 2,754,884 | Jefferys et al. | July 17, 1956 |
| 2,838,091 | Kraft | June 10, 1958 |